(12) United States Patent
Mody et al.

(10) Patent No.: US 8,707,436 B2
(45) Date of Patent: *Apr. 22, 2014

(54) DEFINING CODE BY ITS FUNCTIONALITY

(75) Inventors: Jigar J. Mody, Bellevue, WA (US); Neil A. Cowie, Duvall, WA (US)

(73) Assignee: Microsoft Corporation, Redmond, WA (US)

( * ) Notice: Subject to any disclaimer, the term of this patent is extended or adjusted under 35 U.S.C. 154(b) by 202 days.

This patent is subject to a terminal disclaimer.

(21) Appl. No.: 13/078,262

(22) Filed: Apr. 1, 2011

(65) Prior Publication Data

US 2011/0191757 A1  Aug. 4, 2011

Related U.S. Application Data

(63) Continuation of application No. 11/436,360, filed on May 18, 2006, now Pat. No. 7,945,956.

(51) Int. Cl.
*G06F 11/00* (2006.01)
*G06F 9/45* (2006.01)

(52) U.S. Cl.
USPC ............... 726/24; 726/25; 717/120; 717/143

(58) Field of Classification Search
USPC ................... 726/22–25; 717/120, 121, 143
See application file for complete search history.

(56) References Cited

U.S. PATENT DOCUMENTS

| | | | |
|---|---|---|---|
| 5,452,442 A | 9/1995 | Kephart | |
| 6,006,329 A | 12/1999 | Chi | |
| 6,338,141 B1 | 1/2002 | Wells | |
| 6,697,950 B1 | 2/2004 | Ko | |
| 6,971,019 B1 | 11/2005 | Nachenberg | |
| 7,325,251 B1 | 1/2008 | Szor | |
| 7,363,493 B2 | 4/2008 | Dotan | |
| 7,409,717 B1 * | 8/2008 | Szor | 726/24 |
| 7,493,658 B2 * | 2/2009 | Shipp | 726/24 |
| 7,640,583 B1 * | 12/2009 | Marinescu et al. | 726/22 |
| 7,739,737 B2 | 6/2010 | Christodorescu et al. | |
| 2002/0178375 A1 | 11/2002 | Whittaker et al. | |
| 2003/0079142 A1 * | 4/2003 | Margalit et al. | 713/200 |
| 2003/0101381 A1 | 5/2003 | Mateev et al. | |
| 2004/0064736 A1 * | 4/2004 | Obrecht et al. | 713/201 |
| 2004/0158729 A1 | 8/2004 | Szor | |
| 2004/0172551 A1 | 9/2004 | Fielding et al. | |
| 2004/0181677 A1 | 9/2004 | Hong et al. | |
| 2004/0255165 A1 | 12/2004 | Szor | |

(Continued)

OTHER PUBLICATIONS

Mark G. Pleszkoch et al, Improving network system with function extraction technology for automated calculation of program behavior, IEEE, 2004.*

(Continued)

*Primary Examiner* — David García Cervetti
*Assistant Examiner* — Shanto M Abedin
(74) *Attorney, Agent, or Firm* — Jim Sfekas; Kate Drakos; Micky Minhas (57) ABSTRACT

A system and method for defining code by its functionality is disclosed. The technology initially accesses a portion of code. Once the portion of code is accessed at least one functional operation embedded in the code is determined. When the functional operation in the code is determined, the portion of code is then defined by the functional operation. In so doing, the portion of code can be defined by functional operation without requiring the consideration of any semantics related to the portion of code.

17 Claims, 5 Drawing Sheets

(56) References Cited

U.S. PATENT DOCUMENTS

| | | | |
|---|---|---|---|
| 2005/0021971 A1* | 1/2005 | Patankar et al. | 713/176 |
| 2005/0028002 A1* | 2/2005 | Christodorescu et al. | 713/200 |
| 2005/0144471 A1 | 6/2005 | Shupak et al. | |
| 2005/0172115 A1* | 8/2005 | Bodorin et al. | 713/152 |
| 2005/0172338 A1* | 8/2005 | Sandu et al. | 726/22 |
| 2005/0188272 A1* | 8/2005 | Bodorin et al. | 714/38 |
| 2005/0198516 A1 | 9/2005 | Marr | |
| 2006/0059457 A1* | 3/2006 | Pandit | 717/106 |
| 2006/0230453 A1* | 10/2006 | Flynn et al. | 726/24 |
| 2007/0039048 A1 | 2/2007 | Shelest et al. | |
| 2007/0083933 A1 | 4/2007 | Venkatapathy et al. | |
| 2007/0199000 A1 | 8/2007 | Shekhel et al. | |
| 2007/0288894 A1 | 12/2007 | Mody | |

OTHER PUBLICATIONS

Mihai Christodorescu et al, Semantics-Aware malware detection, IEEE, 2005.*

Christopher Kruegel, Behavioral and Structural Properties of Malicious Code, pp. 1-22, 2005.*

Gordon, et al., "Antivirus Software Testing for the New Milleniurn," <http://csrc.nist.gov/nissc/2000/proceedings/papers/038.pdf>, 2000, 15 pages.

Schultz, et al., "Data Mining Methods for Detection of New Malicious Executables," <http://www1.cs.columbia.edu/ids/publications/binaryeval-ieeesp01.pdf>, 2001, 12 pages.

Morales et al., "Testing and Evaluation of Virus Detectors for Handheld Devices," <http://www.cs.fiu.edu/~jmora009/Testing-and-Evaluation-Virus-Detectors-Handheld-Devices.pdf>, 2006, 8 pages.

Dullien, "Graph-based Comparison of Executable Objects," 2005, University of Technology, Florida, 8 pages.

Flake, "Structural Comparison of Executable Objects." 2004, In Proceedings of the IEEE Conference of Detection of Intrusions and Malware & Vulnerability Assessment (DIMVA), pp. 161-173.

Non-Final Rejection, U.S. Appl. No. 11/436,360, dated Sep. 17, 2010, 9 pages.

Response to Non-Final Rejection, U.S. Appl. No. 11/436,360, dated Dec. 14, 2010, 8 pages.

Notice of Allowance and Fees Due, U.S. Appl. No. 11/436,360, dated Jan. 14, 2011, 11 pages.

* cited by examiner

| Code 302 | Source 304 | Operation 306 | Destination 308 |
|---|---|---|---|
| MOV    BX,02A7 |  | =02A7 | BX |
| MOV    BP,155C |  | =155C | BP |
| MOV    SI,002B |  | =002B | SI |
| XOR    BYTE    PTR [BP+SI],14 | M[BP+SI] | ^14 | M[BP+SI] |
| INC    SI | SI | +1 | SI |
| DEC    BX | BP | -1 | BX |
| JNE    XXXX |  |  |  |

| Name 322 | Symbol 324 | Size 326 | Current Value 328 |
|---|---|---|---|
| Ra1 | BX | 2 | 02A7 |
| Rb1 | BP | 2 | 155C |
| Rc1 | SI | 2 | 002B |
| Ma1 | [BP+SI] | 1 |  |
| Ma2 | [BP+SI] | 1 | Ma1 ^14 |
| Rc2 | SI | 2 | Rc1+1 |
|  |  |  | 002B+1 |
|  |  |  | 002C |
| Ra2 | BX | 2 | Ra1-1 |
|  |  |  | 02A7-1 |
|  |  |  | 02A6 |

| Code 372 | Source 374 | Operation 376 | Destination 378 |
|---|---|---|---|
| MOV    BX,02A7 |  | =02A7 | Ra1 |
| MOV    BP,155C |  | =155C | Rb1 |
| MOV    SI,002B |  | =002B | Rc1 |
| XOR    BYTE    PTR [BP+SI],14 | M[Rbl+Rc1] | ^14 | M[Rb1+Rc1] |
| INC    SI | Rc1 | +1 | Rc2 |
| DEC    BX | Ra1 | -1 | Ra2 |
| JNE    XXXX |  |  |  |

| Code 402 | Source 404 | Operation 406 | Destination 408 |
|---|---|---|---|
| MOV DI,14C6 | | =14C6 | DI |
| MOV CX,02A6 | | =02A6 | CX |
| INC CX | CX | +1 | CX |
| MOV BX,00C1 | | =00C1 | BX |
| XOR BYTE PTR [BX+DI],14 | M[BX+DI] | ^14 | M[BX+DI] |
| INC BX | BX | +1 | BX |
| LOOP XXXX | | | |

| Name 422 | Symbol 424 | Size 426 | Current Value 428 |
|---|---|---|---|
| Ra1 | DI | 2 | 14C6 |
| Rb1 | CX | 2 | 02A6 |
| Rc1 | BX | 2 | 00C1 |
| Ma1 | [BX+DI] | 2 | |
| Ma2 | [BX+DI] | 2 | Ma1 ^14 |
| Rc2 | BX | 2 | Rc1+1 |
| | | | 00C1+1 |
| | | | 00C2 |
| Rb2 | CX | 2 | Rb1+1 |
| | | | 02A6+1 |
| | | | 02A7 |

| Code 472 | Source 474 | Operation 476 | Destination 478 |
|---|---|---|---|
| MOV DI,14C6 | | =14C6 | Ra1 |
| MOV CX,02A6 | | =02A6 | Rb1 |
| INC CX | Rb1 | +1 | Rb2 |
| MOV BX,00C1 | | =00C1 | Rc1 |
| XOR BYTE PTR [BX+DI],14 | M[Rc1+Ra1] | ^14 | M[Rc1+Ra1] |
| INC BX | Rc1 | +1 | Rc2 |
| LOOP XXXX | | | |

FIG. 4c

FIG. 5

DEFINING CODE BY ITS FUNCTIONALITY

CROSS-REFERENCE TO RELATED APPLICATIONS

This application claims priority to and is a continuation of co-pending U.S. patent application Ser. No. 11/436,360 entitled "Defining Code By Its Functionality" and filed May 18, 2006, which is incorporated herein by reference.

BACKGROUND

Malware is software designed to infiltrate or damage a computer system, without the owner's consent. The term is probably a combination of "malicious" and "software", and describes the intent of the creator, rather than any particular features. The term malware normally encompasses computer viruses, Trojan horses, spyware and adware.

Many early infectious programs, including the Internet Worm and a number of viruses, were written as experiments or pranks. That is, they were intended to be annoying rather than to cause serious damage. For example programmers might write one just to prove that they can do it, or to see how far it could spread.

A slightly more hostile intent can be found in programs designed to vandalize or cause data loss. For example, some viruses are designed to destroy files or corrupt a file system by writing junk data. Other viruses include network-borne worms designed to vandalize Web pages. In other cases, revenge is the motivator for writing malicious software. For example, a programmer about to be fired from a job will generate a virus to damage the former employer's systems or destroy their own earlier work.

Moreover, a large portion of malicious software is focused strictly on a profit motive. For example, a majority of viruses and worms have been designed to take control of users' computers. Infected computers are "hijacked" and are remotely used to send email spam, host contraband data or engage in distributed denial-of-service attacks as a form of extortion.

Another strictly for-profit category of malware has emerged in spyware. That is, programs designed to monitor users' Internet browsing. In some cases, the spyware displays unsolicited advertisements which provide marketing revenues to the spyware creator.

Presently, pluralities of anti-virus methods are used in order to detect and stop malware spread or initial infection. One method for detecting malware is signature based detection. In general, the malware signatures are derived from the malware code or strings that are used in the code. For example, when malware is discovered, an anti-virus provider will analyze the malware code and provide a signature, e.g., a hash, string based structure, or the like, to recognize the malware code. Then, whenever the malware code appears, the anti-virus software will recognize the malware signature and the malware will be defeated.

For example, many anti-virus software and intrusion detection systems attempt to locate malicious code by searching through computer files and data packets. If the security software finds patterns that correspond to known computer viruses or worm signatures, the appropriate steps are taken to neutralize the threat.

However, malware writers have come up with a plurality of ways of overcoming the code signature detection methods. For example, overcoming methods include polymorphic code, metamorphic code and the like. In general, polymorphic code is code that mutates while keeping the original algorithm intact. Polymorphic algorithms make it difficult for anti-virus software to locate the offending code as the malware is constantly changing its signature.

Moreover, metamorphic code is code that can reprogram itself. Often, the reprogramming is accomplished by translating its own code into a temporary representation, and then back to normal code again. This is used by some viruses when they infect new files. The result is "children" that do not look like the "parent".

Encryption is the most commonly used method of achieving metamorphism and polymorphism in code. However, all of the code cannot be encrypted or else it would be completely unusable. Therefore, a small portion of the malware is left unencrypted and is used to start the encrypted software. In other words, the actual algorithm does not change, but everything else might. Thus, by rewriting the unencrypted decryption engine each time the virus or worm is propagated, signature recognition as used by anti-virus software is significantly reduced.

Therefore, what is needed is a method for detecting malware or other code that is not deceived by metamorphic or polymorphic code.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A system and method for defining code by its functionality is disclosed. The technology initially accesses a portion of code. Once the portion of code is accessed at least one functional operation embedded in the code is determined. When the functional operation in the code is determined, the portion of code is then defined by the functional operation. In so doing, the portion of code can be defined by functional operation without requiring the consideration of any semantics related to the portion of code.

DESCRIPTION OF THE DRAWINGS

The accompanying drawings, which are incorporated in and form a part of this specification, illustrate embodiments of the technology for defining code by its functionality and, together with the description, serve to explain principles discussed below.

The drawings referred to in this description should be understood as not being drawn to scale except if specifically noted.

DETAILED DESCRIPTION

Reference will now be made in detail to embodiments of the present technology for defining code by its functionality, examples of which are illustrated in the accompanying drawings. While the technology for defining code by its functionality will be described in conjunction with various embodiments, it will be understood that they are not intended to limit the present technology for defining code by its functionality to these embodiments. On the contrary, the presented technology for defining code by its functionality is intended to cover alternatives, modifications and equivalents, which may be included within the spirit and scope the various embodiments as defined by the appended claims.

Furthermore, in the following detailed description, numerous specific details are set forth in order to provide a thorough understanding of the present technology for defining code by its functionality. However, the present technology for defining code by its functionality may be practiced without these specific details. In other instances, well known methods, procedures, components, and circuits have not been described in detail as not to unnecessarily obscure aspects of the present embodiments.

Unless specifically stated otherwise as apparent from the following discussions, it is appreciated that throughout the present detailed description, discussions utilizing terms such as "receiving", "performing", "generating", "displaying", "selecting", "scrolling", "highlighting", "presenting", "testing", "identifying", "reporting", "prompting", "suppressing", "providing", and "refreshing" or the like, refer to the actions and processes of a computer system, or similar electronic computing device. The computer system or similar electronic computing device manipulates and transforms data represented as physical (electronic) quantities within the computer system's registers and memories into other data similarly represented as physical quantities within the computer system memories or registers or other such information storage, transmission, or display devices. The present technology for defining code by its functionality is also well suited to the use of other computer systems such as, for example, optical and mechanical computers. Additionally, it should be understood that in embodiments of the present technology for defining code by its functionality, one or more of the steps can be performed manually.

Example Computer System Environment

Figure 1:
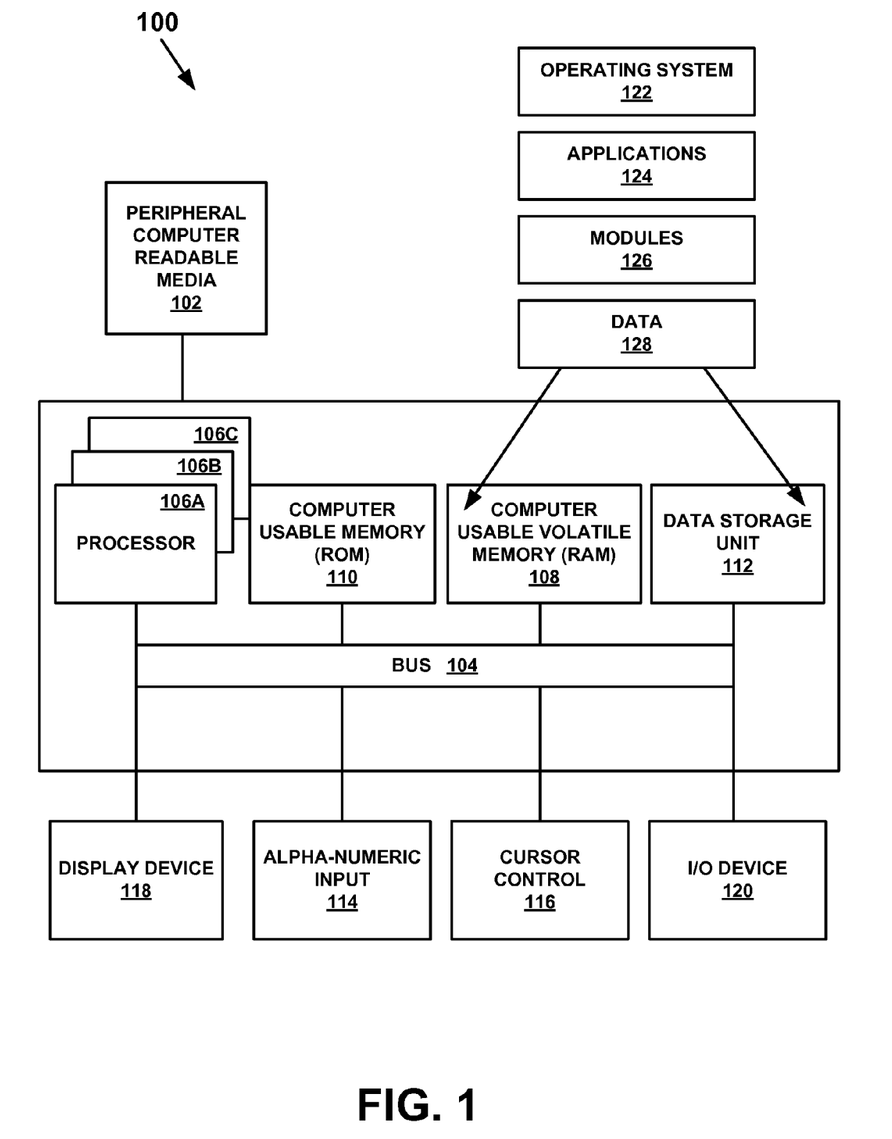
FIG. 1 is a diagram of an exemplary computer system used in accordance with embodiments of the present technology for defining code by its functionality.

With reference now to FIG. 1, portions of the technology for defining code by its functionality are composed of computer-readable and computer-executable instructions that reside, for example, in computer-usable media of a computer system. That is, FIG. 1 illustrates one example of a type of computer that can be used to implement embodiments, which are discussed below, of the present technology for defining code by its functionality.

FIG. 1 illustrates an exemplary computer system 100 used in accordance with embodiments of the present technology for defining code by its functionality. It is appreciated that system 100 of FIG. 1 is exemplary only and that the present technology for defining code by its functionality can operate on or within a number of different computer systems including general purpose networked computer systems, embedded computer systems, routers, switches, server devices, consumer devices, various intermediate devices/artifacts, stand alone computer systems, and the like. As shown in FIG. 1, computer system 100 of FIG. 1 is well adapted to having peripheral computer readable media 102 such as, for example, a floppy disk, a compact disc, and the like coupled thereto.

System 100 of FIG. 1 includes an address/data bus 104 for communicating information, and a processor 106A coupled to bus 104 for processing information and instructions. As depicted in FIG. 1, system 100 is also well suited to a multi-processor environment in which a plurality of processors 106A, 106B, and 106C are present. Conversely, system 100 is also well suited to having a single processor such as, for example, processor 106A. Processors 106A, 106B, and 106C may be any of various types of microprocessors. System 100 also includes data storage features such as a computer usable volatile memory 108, e.g. random access memory (RAM), coupled to bus 104 for storing information and instructions for processors 106A, 106B, and 106C.

System 100 also includes computer usable non-volatile memory 110, e.g. read only memory (ROM), coupled to bus 104 for storing static information and instructions for processors 106A, 106B, and 106C. Also present in system 100 is a data storage unit 112 (e.g., a magnetic or optical disk and disk drive) coupled to bus 104 for storing information and instructions. System 100 also includes an optional alphanumeric input device 114 including alphanumeric and function keys coupled to bus 104 for communicating information and command selections to processor 106A or processors 106A, 106B, and 106C. System 100 also includes an optional cursor control device 116 coupled to bus 104 for communicating user input information and command selections to processor 106A or processors 106A, 106B, and 106C. System 100 of the present embodiment also includes an optional display device 118 coupled to bus 104 for displaying information.

Referring still to FIG. 1, optional display device 118 of FIG. 1 may be a liquid crystal device, cathode ray tube, plasma display device or other display device suitable for creating graphic images and alphanumeric characters recognizable to a user. Optional cursor control device 116 allows the computer user to dynamically signal the movement of a visible symbol (cursor) on a display screen of display device 118. Many implementations of cursor control device 116 are known in the art including a trackball, mouse, touch pad, joystick or special keys on alpha-numeric input device 114 capable of signaling movement of a given direction or manner of displacement. Alternatively, it will be appreciated that a cursor can be directed and/or activated via input from alpha-numeric input device 114 using special keys and key sequence commands.

System 100 is also well suited to having a cursor directed by other means such as, for example, voice commands. System 100 also includes an I/O device 120 for coupling system 100 with external entities. For example, in one embodiment, I/O device 120 is a modem for enabling wired or wireless communications between system 100 and an external network such as, but not limited to, the Internet. A more detailed discussion of the present technology for defining code by its functionality is found below.

Referring still to FIG. 1, various other components are depicted for system 100. Specifically, when present, an operating system 122, applications 124, modules 126, and data 128 are shown as typically residing in one or some combination of computer usable volatile memory 108, e.g. random access memory (RAM), and data storage unit 112. In one embodiment, the present technology for defining code by its functionality, for example, is stored as an application 124 or module 126 in memory locations within RAM 108 and memory areas within data storage unit 112.

Overview

As an overview, in one embodiment, the present technology provides a method and system for defining code by its functionality. That is, instead of defining a portion of code by a signature derived from a hash or the like, the present technology reduces the portion of code to the functional level. Once the code is reduced to the functional level, a signature of the function of the code is obtained. In so doing, a portion of code performing a specific functionality is recognizable regardless of any type of polymorphic code that is used.

In general, a portion of code is any part of a computer language such as C, C++, Pascal, Fortran, or the like which is used for computer operation. In one embodiment, the portion of code is a complete program code. In another embodiment, the portion of code is only a section of a program code or the like. Thus, the code is referred to herein as a portion of code, a block of code, a region of code and the like.

Figure 2:
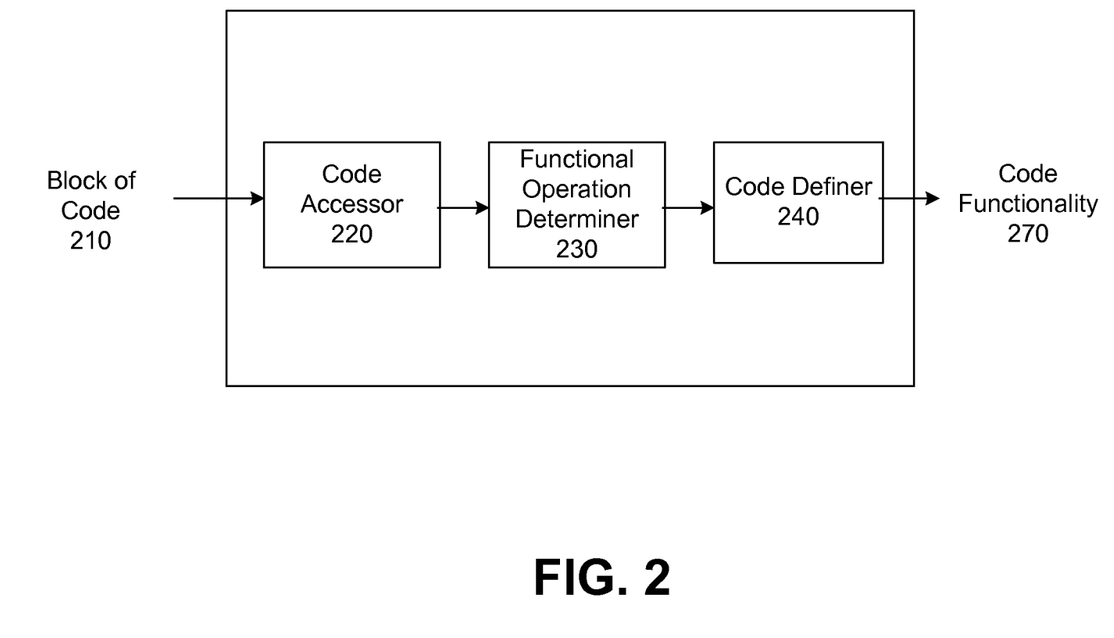
FIG. 2 is a block diagram of an exemplary code functionality extractor in accordance with an embodiment of the present technology for defining code by its functionality.

With reference now to FIG. 2, one embodiment of a block diagram of an exemplary code functionality extractor 200 for deriving the representation of the functionality 270 from a block of code 210 is shown. In one embodiment, code functionality extractor 200 includes a code accessor 220, a functional operation determiner 230 and a code definer 240.

Figure 3A:
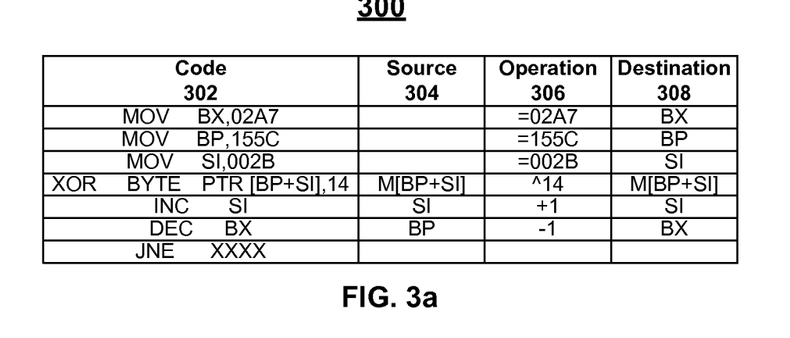
FIG. 3a is a table of an exemplary operation list in accordance with an embodiment of the present technology for defining code by its functionality.
Figure 4A:
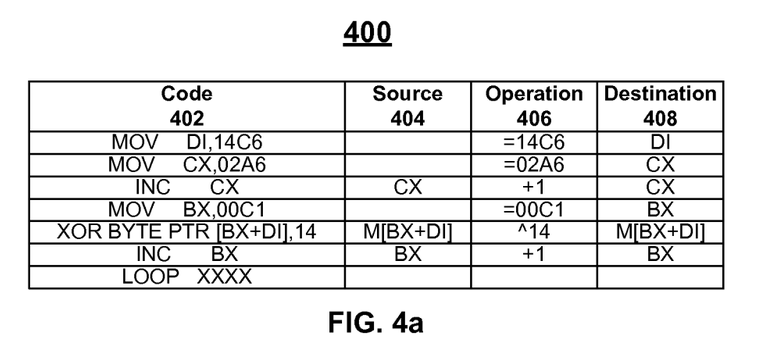
FIG. 4a is a table of an exemplary operation list in accordance with another embodiment of the present technology for defining code by its functionality.

In general, accessor 220 is utilized to expand an instruction in a portion of code 210 into a list of functional operations such as table 300 of FIGS. 3a and 400 of FIG. 4a. In one embodiment, the functional operations include a destination portion 308, an operation portion 306, and a source portion 304 for each operation definition (e.g., code 302) in the list of functional operations. Although the table 300 and 400 include a plurality of object definitions, the list is neither complete nor limited to the provided definitions. As such, the present technology is well suited to a table that utilizes more defining variables as well as a table that uses a less number of variables.

The functional operation determiner 230 creates a list of object definitions each time a source or a destination is used. In one embodiment, such as table 350 of FIGS. 3b and 450 of FIG. 4b, the object definitions created by the functional operation determiner 230 include a name 322, a symbol 324, a size 326 and a current value 328. Although the table 350 and 450 include a plurality of object definitions, the list is neither complete nor limited to the provided definitions. As such, the present technology is well suited to a table that utilizes more defining variables as well as a table that uses a less number of variables.

Figure 3B:
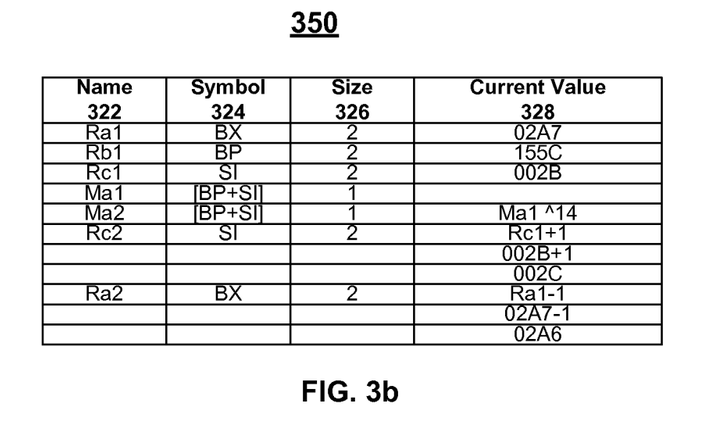
FIG. 3b is a table of an exemplary object list in accordance with an embodiment of the present technology for defining code by its functionality.

Additionally, in one embodiment, the current value 328 is updated when the object definitions are used as a destination. Furthermore, the object definitions symbol 324 is replaced with the object definitions current value 328 when the symbol is used as a source.

The functional operation determiner 230 further substitutes a portion of the object definition into a portion of the list of functional operations. In one embodiment, such as table 375 of FIGS. 3c and 475 of FIG. 4c, the substitution operation table includes a code 372 that utilizes the operation list code 302 include a destination portion 308. Substitution operation table 375 also includes a source portion 374 which substitutes the source 304 references of FIG. 3a with the names 322 of FIG. 3b.

Substitution operation table 375 also includes an operation column 376 which utilizes the operation column 306 of FIG. 3a. Substitution operation table 375 further includes a destination column 378 which substitutes the destination 308 references of FIG. 3a with the names 322 of FIG. 3b. Although the table 375 and 475 include a plurality of object definitions, the list is neither complete nor limited to the provided definitions. As such, the present technology is well suited to a table that utilizes more defining variables as well as a table that uses a less number of variables.

The code definer 240 extracts a list of inputs and a list of outputs from the list of object definitions and expresses the code functionality 270 as a list of current values of the outputs. In one embodiment, the current values are expressed as the input times the operation.

Figure 5:
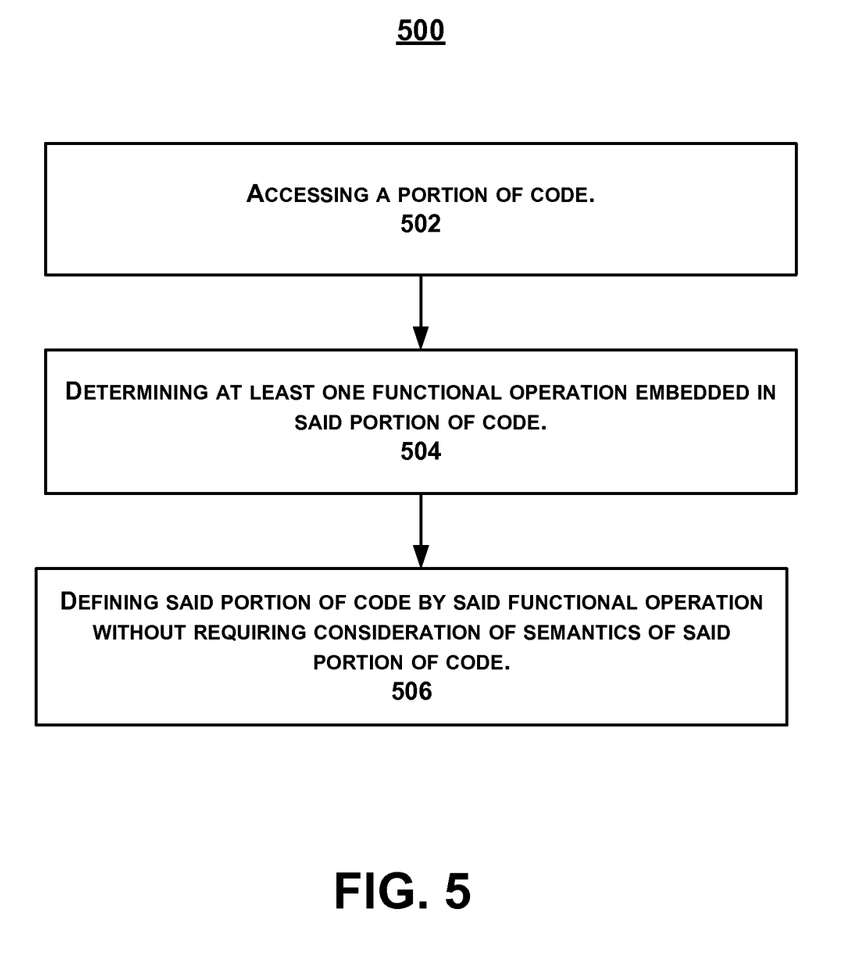
FIG. 5 is a flowchart of operations performed in accordance with one embodiment of the present technology for defining code by its functionality.

With reference now to FIG. 5, a flowchart 500 of operations performed in accordance with one embodiment of the present technology for defining code by its functionality is shown. Advantageously, the present technology provides a method of deriving the representation of the functionality from a portion of code. Moreover, unlike present approaches, the present technology uses functionality based signatures, instead of code based signatures, for detecting malware or other portions of code.

Referring now to 502 of FIG. 5 and FIG. 3a, in one embodiment of the present technology accesses a portion of code such as portion of code 210 of FIG. 2. In one embodiment, the portion of code is accessed by code accessor 220. After accessing a portion of code, the portion of code is reduced into an operation list of at least one operational component. In another embodiment, the present technology reduces the portion of code into a list of every operational component. For example, as shown in FIG. 3a, the operational list includes sorting the at least one operational component into a code portion 302, a source portion 304, an operation portion 306 and a destination portion 308. In other words, the high level assembly language instructions are broken down into their fundamental functionality.

For example, in table 300 the first three code 302 inputs assign values to different registers. More specifically, MOV BX,02A7 puts the number 02A7 into the register BX, MOV BP,155C puts the number 155C into the register BP and MOV SI,002B puts the number 002B into the register SI. The fourth code 302 input takes the memory pointed to by the values BP and SI Exclusively ORing (XOR) it with the value 14 and storing it back into memory location [BP+SI]. The fifth code 302 input increments memory location SI by one. The sixth code 302 decrements memory location BX by one. The seventh code 302 input is a relative jump which in one embodiment, is ignored.

That is, in one embodiment, any calls, e.g., branch or jump operational components, of the portion of code are disregarded when translating the portion of code into at least one operational component. In another embodiment, the calls are followed and mapped. For example, each time the exterior code was called, the current process, e.g., table 300, would be reevaluated based on the code called.

With reference now to 504 of FIG. 5 and FIG. 3b, one embodiment determines at least one functional operation embedded in the portion of code. In one embodiment, the functional operation embedded in the code is determined by generating an object list based on the at least one operational component. That is, after the assembly code is broken down into simple operations, e.g., performing operation on a source 304 and putting it into a destination 308, the list of operational code 302 is used to create an object table 350. In general, the object table or list 350 has four properties.

For example, the object list 350 includes providing a name 322 for the at least one operational component, providing a symbol 324 for the at least one operational component, providing a size 326 of the at least one operational component, and providing a current value 328 for the at least one operational component.

The name 322 is based on what the object is, for example, a memory, a register, an I.O. port, and the like. In one embodiment, the object names are of the format Aa9, where A is either R, M, I to denote Register, Memory or I/O port,
a is a lowercase letter, used to uniquely identify the object, and
9 is used as an numeric instance count.

In one embodiment, the objects current value 328 is updated when ever the object is used as a destination. It is also appreciated that the current value 328 of an object may depend on other objects. For example, the first object has a name 322 Ra1 with a symbol 324 BX a size 326 of 2 bytes and a current value 328 02A7. The first row of table 350 is taken straight from the first row of table 300. Thus, it is clear that the next two rows of table 350 (e.g., Rb1 and Rc1) are similar to Ra1 and are taken from the second and third row of table 300 respectively.

Row 4 of table 350 provides an object name 322 of memory location Ma1 as is clearly shown, Ma1 does not have a current value 328 because it is used in this case as a source. At row 5, of table 350, Ma2, the same memory location but a new instance, is used as a destination and therefore has a current value 328. At row 6, Rc2, same memory location new instance, is incremented. In table 350, the current value 328 column provides the entire increment event. However, the addition is shown in the column merely for purposes of clarity. This row 6 of table 350 is analogous to row 5 of table 300. At row 9, a decrement occurs for object name Ra2 in the same fashion as described in Rc2.

Figure 3C:
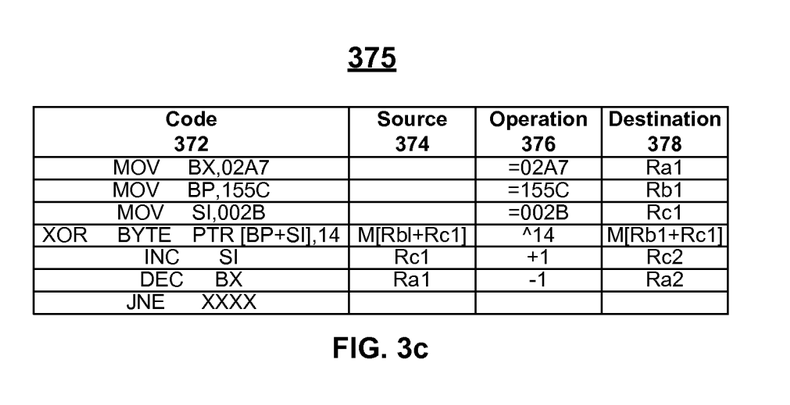
FIG. 3c is a table of an exemplary substitution list in accordance with an embodiment of the present technology for defining code by its functionality.

Referring still to 504 of FIG. 5 and now to FIG. 3c, one embodiment combines a portion of the object list 350 with a portion of the operation list 300 to form a concatenated list. In other words, a substitute list 375 is created by substituting a portion of the object list 350 into a portion of the operation list 300. For example, as shown in FIG. 3c, the substitute list 375 includes substituting a name portion 322 of the object list 350 wherever the symbol 324 occurs in the operation list 300.

Referring still to 504 of FIG. 5 and now to FIGS. 3b and 3c, one embodiment identifies at least one input, e.g., Ma1, and at least one output, e.g., Ma2, in the object table 350. For example, identifying the at least one input includes selecting at least one operational component e.g., Ma1, that is used as a source 374 before being used as a destination 378. Furthermore, identifying the at least one output includes selecting at least one operational component, e.g., Ma2, that is used as a destination 378 and derives its value from the at least one input Ma1.

Referring now to 506 of FIG. 5 and FIG. 2, one embodiment defines the portion of code by the functional operation without requiring consideration of the semantics of the portion of code. That is, the functionality 270 of the at least one input, e.g., Ma1, and the at least one output, e.g., Ma2, is used to define the portion of code 210. Thus, in the present example:

Input=((Output)$Op$)

From Table 350 Ma2=Ma1^14
Substituting from Table 375 M[Rb1+Rc1]=M[Rb1+Rc1]^14
Substituting from Table 350 M[155C+002B]=M[155C+002B]^14
Functionality in Simplest form M[1587]=M[1587]^14

Therefore, in its simplest form, anytime the functionality M[1587]=M[1587]^14 occurs, it is the same functionality in the portion of code regardless of the surrounding modifiable code. Thus, any modification to memory, registers, I/O ports, or the like is not noted in the functionality signature. Therefore, if the code tries to include any type of metamorphic or polymorphic distraction code. The code is ignored because it is the functionality of the code that is being recognized.

Figure 4B:
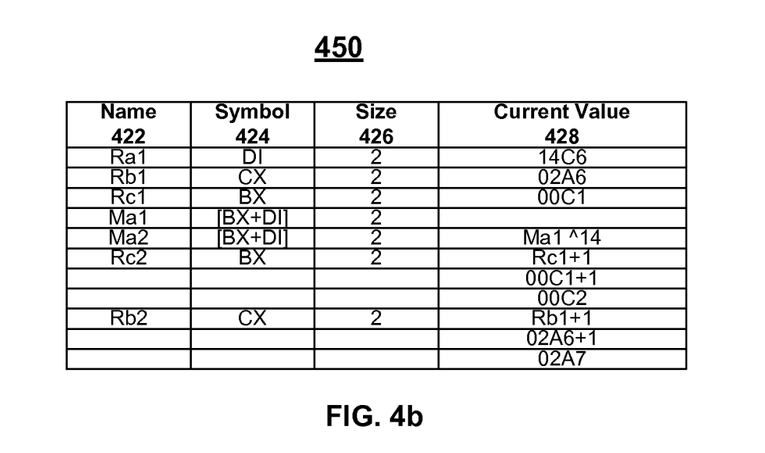
FIG. 4b is a table of an exemplary object list in accordance with another embodiment of the present technology for defining code by its functionality.
Figure 4C:
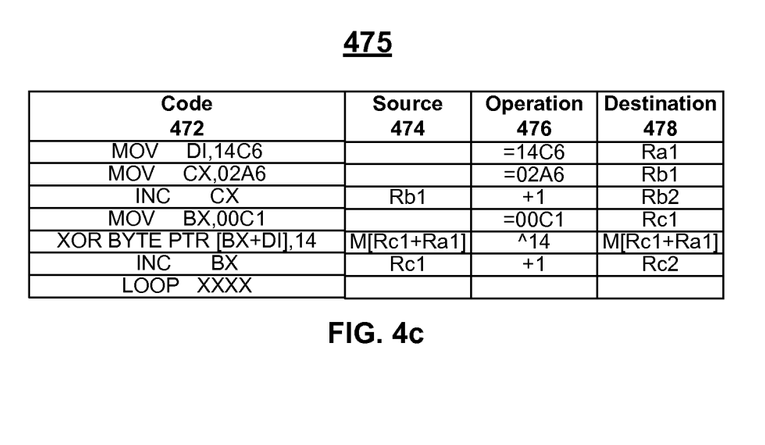
FIG. 4c is a table of an exemplary substitution list in accordance with another embodiment of the present technology for defining code by its functionality.

To prove, that the functionality occurs in the same fashion regardless of the surrounding code, the same methodology except that the code provided by FIGS. 3a-3c will be replaced by the code provided by FIGS. 4a-4c. In general, the operation of FIGS. 4a-4c is directly correlated to that of FIGS. 3a-3c except different values are provided as a means of mimicking metamorphic or polymorphic distraction code.

Referring now to FIG. 4a, one embodiment translates a portion of code into an operation list of at least one operational component. For example, as shown in FIG. 4a, the operational list includes sorting the at least one operational component into a code portion 402, a source portion 404, an operation portion 406 and a destination portion 408. In other words, the high level assembly language instructions are broken down into there fundamental functionality.

For example, in table 400 the first two code 402 inputs assign values to different registers. More specifically, MOV DI,14C6 puts the number 14C6 into the register DI, MOV CX,02A6 puts the number 02A6 into the register CX. The third code 402 input increments memory location CX by one. The fourth code 402 MOV BX,00C1 puts the number 00C1 into the register BX. The fifth code 402 input takes the memory pointed to by the values BX and DI Exclusively ORing (XOR) it with the value 14 and storing it back into memory location [BX+DI]. The sixth code 402 increments memory location BX by one. The seventh code 402 input is a relative loop which in one embodiment, is ignored.

That is, in one embodiment, any calls, e.g., branch or jump operational components, of the portion of code are disregarded when translating the portion of code into at least one operational component. In another embodiment, the calls are followed and mapped. For example, each time the exterior code was called, the current process, e.g., table 400, would be reevaluated based on the code called.

With reference now to FIG. 4b, one embodiment generates an object list based on the at least one operational component. That is, once the assembly code is broken down into simple operations, e.g., performing operation on a source 404 and putting it into a destination 408, the list of operational code 402 is used to create an object table 450. in general, the object table or list 450 has four properties.

In one embodiment, the objects current value 428 is updated when ever the object is used as a destination. It is also appreciated that the current value 428 of an object may depend on other objects. For example, the first object has a name 422 Ra1 with a symbol 424 DI a size 426 of 2 bytes and a current value 428 14C6. The first row of table 450 is taken straight from the first row of table 400. Thus, it is clear that the next two rows of table 450 (e.g., Rb1 and Rc1) are similar to Ra1 and are taken from the second and third row of table 400 respectively.

Row 4 of table 450 provides an object name 422 of memory location Ma1 as is clearly shown, Ma1 does not have a current value 428 because it is used in this case as a source. At row 5, of table 450, Ma2, the same memory location but a new instance, is used as a destination and therefore has a current value 428. At row 6, Rc2, same memory location new instance, is incremented. In table 450, the current value 428 column provides the entire increment event. However, the addition is shown in the column merely for purposes of clarity. This row 6 of table 450 is analogous to row 5 of table 400. At row 9, an increment occurs for object name Rb2 in the same fashion as described in Rc2.

Referring now to FIG. 4c, one embodiment creates a substitute list 475 by substituting a portion of the object list 450 into a portion of the operation list 400. For example, as shown in FIG. 4c, the substitute list 475 includes substituting a name portion 422 of the object list 450 wherever the symbol 424 occurs in the operation list 400.

Referring now to FIGS. 4b and 4c, one embodiment identifies at least one input, e.g., Ma1, and at least one output, e.g., Ma2, in the object table 450. For example, identifying the at least one input includes selecting at least one operational component e.g., Ma1, that is used as a source 474 before being used as a destination 478. Furthermore, identifying the at least one output includes selecting at least one operational component, e.g., Ma2, that is used as a destination 478 and derives its value from the at least one input Ma1.

Referring now to FIGS. 4a-4c and FIG. 2, one embodiment utilizes a functionality of the at least one input, e.g., Ma1, and the at least one output, e.g., Ma2, to define the portion of code 210. Thus, in the present example:

Input=((Output)$Op$)

From Table 450 Ma2=Ma1^14
Substituting from Table 475 M[Rc1+Ra1]=M[Rc1+Ra1]^14
Substituting from Table 450 M[00C1+14C6]=M[00C1+14C6]^14
Functionality in Simplest form M[1587]=M[1587]^14

Thus, by working through the example of FIGS. 4a-4c as provided herein, the present technology shows that the result is the same functionality, e.g., M[1587]=M[1587]^14, and the distracting code is simply ignored.

In one embodiment, the present technology acts as a malware detector and utilizes the functionality of the at least one input and the at least one output to define the portion of code to detect malware. Although malware detection is used in an example herein, it is merely for purposes of brevity and clarity. That is, the present technology is well suited for detecting any type of code based on the functionality.

Thus, the present embodiments provide a method and system for defining code by its functionality. In addition, embodiments described herein provide a method and system for defining code by its functionality which includes ignoring any metamorphic or polymorphic distraction code. In so doing, a portion of code can be evaluated and the functionality of the code can be detected. This method significantly reduces the difficulty of malware detection process while significantly increasing the detection rate of the malware.

Although the subject matter has been described in a language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method, comprising:
   receiving code at a computer system; and
   using a processor, detecting malware designed to infiltrate the computer system without consent of a user of the computer system, wherein detecting malware is based on a definition of a portion of said code according to at least one functional operation embedded in said portion of said code, wherein the definition defines the portion of said code without requiring consideration of semantics of said portion of said code, wherein said definition of said portion of said code according to at least one functional operation embedded in said portion of said code is based on providing said portion of said code into an operational list comprising said at least one functional operation, wherein said definition of said portion of said code according to at least one functional operation embedded in said portion of said code is based on:
   generating an object list, said object list comprising a name for said at least one functional operation based on said object type;
   combining a portion of said object list with a portion of said operation list into a concatenated list;
   identifying at least one input and at least one output in said concatenated list; and
   utilizing said at least one functional operation of said at least one input and said at least one output to define said portion of said code.

2. The computer-implemented method of claim 1 wherein said operational list comprises:
   providing said at least one functional operation into a code portion, a source portion, an operation portion and a destination portion.

3. The computer-implemented method of claim 1 further comprising:
   disregarding any call, branch or jump operational components of said portion of said code when translating said portion of said code into at least one operational component.

4. The computer-implemented method of claim 1 wherein said object list further comprises:
   providing a symbol for said at least one functional operation;
   providing a size of said at least one functional operation; and
   providing a current value for said at least one functional operation.

5. The computer-implemented method of claim 1 further comprising:
   defining said at least one input as said at least one functional operation object type that is used as a source before being used as a destination; and
   defining said at least one output as said at least functional operation object type that is used as a destination and derives its value from said at least one input.

6. A system comprising:
   a computer comprising:
   a code receiver for receiving a block of code;
   a malware detector for detecting malware based on a definition of said block of code according to at least one functional operation embedded in said bock of code, wherein the definition defines the block of code without requiring consideration of semantics of said block of code such that functionality of at least one input and at least one output is used to define said block of code, wherein the at least one input is identified by selecting an operational component that is used as a source before being used as a destination and the at least one output is identified by selecting an operational component that is used as a destination and derives its value from the at least one input;

a code expander coupled with said code receiver, said code expander for expanding an instruction in the block of code into a list of functional operations; and a parser coupled with said code expander, said parser for creating a list of object definitions each time a source or a destination is used.

7. The system of claim 6 further comprising:
a replacer coupled with said parser, said replacer for substituting a portion of said object definition into a portion of said list of functional operations.

8. The system of claim 6 further comprising:
an extractor for extracting a list of inputs and a list of outputs from said list of object definitions; and
a resolver coupled with said extractor, said resolver for expressing the code functionality as a list of current values of said outputs.

9. The system of claim 8 wherein said functional operations comprise:
a destination portion;
an operation portion; and
a source portion for each operation definition in said list of functional operations.

10. The system of claim 6 wherein said object definitions created by said parser comprises:
a name;
a symbol;
a size;
and a current value.

11. The system of claim 10 wherein said current value is updated when said object definitions are used as a destination, wherein said object definitions symbol is replaced with the object definitions current value when said symbol is used as a source, and wherein said current values are expressed as said input times said operation.

12. A computer-implemented method, comprising:
receiving code at a computer system; and
using a processor, detecting malware designed to infiltrate the computer system without consent of a user of the computer system, wherein detecting malware based on a functionality based signature of said code instead of a code based signature of said code such that functionality of at least one input and at least one output is used to define said code, wherein the at least one input is identified by selecting an operational component that is used as a source before being used as a destination and the at least one output is identified by selecting an operational component that is used as a destination and derives its value from the at least one input;

sorting a region of said code into a table of operational components, wherein said table of operational components is sorted into at least one of a code portion, a source portion, an operation portion and a destination portion; and generating an object table based on said table of operational components, wherein said object table is sorted into at least one of a name portion, a symbol portion, a size portion and a current value portion.

13. The method of claim 12, wherein the functionality based signature of said code is obtained by:
creating a substitute table, said substitute table combining a portion of said object table with a portion of said table of operational components comprising at least one output and at least one input;
expressing said region of code as a functionality of said at least one input and said at least one output of said substitute table; and
utilizing said expressing said region of code as the functionality based signature to detect malware.

14. The method of claim 13, wherein the functionality based signature of said code is further is obtained by ignoring any branch or jump operational components of said region of said code when sorting said region of code into at least one operational component.

15. The method of claim 13 wherein said substitute table comprises:
substituting a name portion of said object table into a correlating source and destination portion of said operation table.

16. The method of claim 13 wherein identifying said inputs comprise:
identifying an operational component in said table of operational components that is used as a source before it is used as a destination.

17. The method of claim 13 wherein identifying said outputs comprise:
identifying an operational component in said table of operational components that is used as a destination and derives its value from said inputs.

* * * * *